May 24, 1960     D. G. KEITH     2,937,403
METHOD AND APPARATUS FOR THE PRODUCTION OF HOLLOW
ARTICLES FROM SHEET SYNTHETIC RESINOUS MATERIALS
Filed Jan. 17, 1958     2 Sheets-Sheet 1

INVENTOR
DONALD G. KEITH

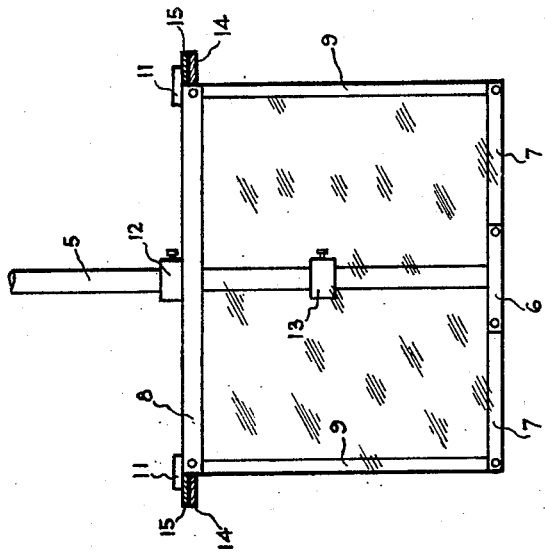
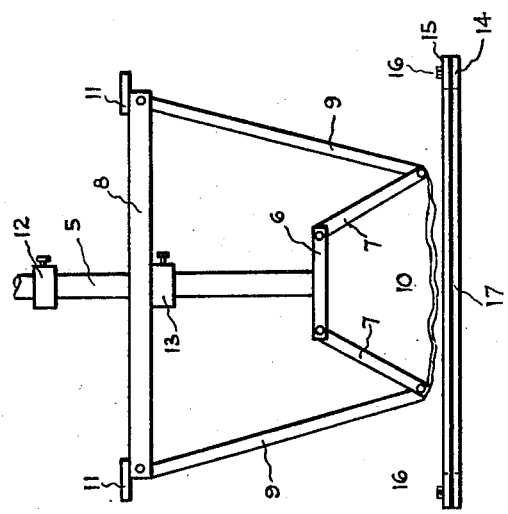

2,937,403

METHOD AND APPARATUS FOR THE PRODUCTION OF HOLLOW ARTICLES FROM SHEET SYNTHETIC RESINOUS MATERIALS

Donald George Keith, Apt. 2, 16 Deepdene Road, Balwyn, Victoria, Australia

Filed Jan. 17, 1958, Ser. No. 709,505

3 Claims. (Cl. 18—19)

Known methods of producing hollow articles from sheet synthetic resinous materials involve the use of male dies corresponding to the inner surface of the article or of female dies having an internal cavity corresponding in shape to the entire external surface of the article, the resin sheet being pressed into shape by the male die or into the cavity by differential gas pressure. The articles produced by the use of the male die are usually thicker at the base than at the sides, while those produced by gas pressure are usually thinner at the base than at the sides. These difficulties are increased in producing articles having a rectangular transverse section, i.e. hollow cylinders or parallelepipeds, and deepdrawn articles in the production of which the plastic sheet is stretched by more than 200% of its original area.

It is principal object of the present invention to produce from synthetic resinous materials hollow articles of wall thickness more uniform than previously obtainable by the shaping of synthetic resin sheet.

It is further object to produce deep-drawn synthetic resinous containers in the shape of hollow rectangular prisms of substantially uniform wall thickness.

These and other objects are attained by the methods, parts, combinations and arrangements comprising the present invention, a preferred embodiment of apparatus for carrying out the invention being shown in the accompanying drawings and described in the specification. Various modifications may be made within the scope of the invention as defined in the appended claims.

The accompanying drawings show an apparatus for producing a cubical container from polythene sheet.

Figure 3 is an elevation in the direction of arrow 3 shown in Figure 1.

Figure 4 is a similar view to Figure 3 showing the apparatus at the completion of the stretching operation.

Figure 2:
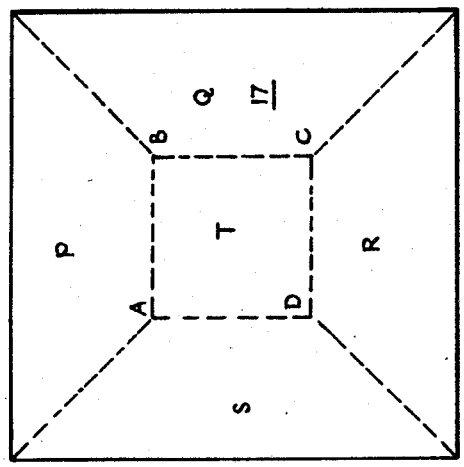
Figure 2 is a plan of the sheet shown in Figure 1.

Referring now to the drawings, the plunger consists of a vertical rod 5 having at its bottom a fitting 6 to which are pivoted four links 7 of such a length and so disposed that when held horizontally one link extends to each corner of a square identical with the base of the finished container; a square plate 8 corresponding in size with the base of the container, apertured centrally and arranged to slide along the rod at right angles thereto; four links 9 each pivoted at one end to the corner of the plate 8 and at the other end to the outer end of the corresponding link 7, the outer ends of the links being connected by flexible wires 10; and lugs 11 secured to the top surface of the plate 8 to project beyond the edges thereof. Adjustable stops 12 and 13 upon the rod 5 limit the movement of the plate 8 with respect to the rod 5.

Located beneath the plunger is holding means comprising a horizontal plate 14 having a square aperture therein of the same size as the base of the article and disposed so that the rod 5 is aligned with the centre of the said aperture, and a clamping plate 15 having an identical aperture and secured with the apertures in registration by set screws 16 which engage threaded recesses in the plate 14. A flat sheet 17 of polythene between 0.004 inch and 0.125 inch thick, heated to the softening temperature, is gripped at the edges between the plates 14 and 15 by tightening the set screws 16.

As the plunger advances downwardly with the stop 13 bearing against the underside of plate 8, the outer ends of the links 7 will engage the sheets 17 at points A, B, C and D (see Figure 2), the relative size of the fitting 16, the lengths of the links 7 and the links 9, and the position of stop 13, being selected so that the portions P, Q, R, S and T of the sheet are each equal in area to one fifth of the area of the apertures in the plates 14 and 15. On further advancing the plunger the portion T is pressed downwardly with respect to the plates 14 and 15, the sheet being stretched accordingly at portions P, Q, R and S, until the lugs 11 strike the upper surface of the plate 15. As the rod 5 continues to movve downwardly, the plate 8 remains fixed in position, the rod 5 passing through the plate 8 until the latter is engaged by the stop 12, at which position the links 7 will have become horizontal and the links 9 vertical, and the wires 10 will be taut, as shown in Figure 4, the sheet portion T being stretched to produce a cubical shape. That is, each of the areas P, Q, R, S and T is stretched to form one side of the cube, and consequently each of these areas is expanded in the same proportion. The plunger is maintained in the expanded position until the polythene has cooled sufficiently to set in the cubical shape, whereupon the plunger is withdrawn.

Figure 1:
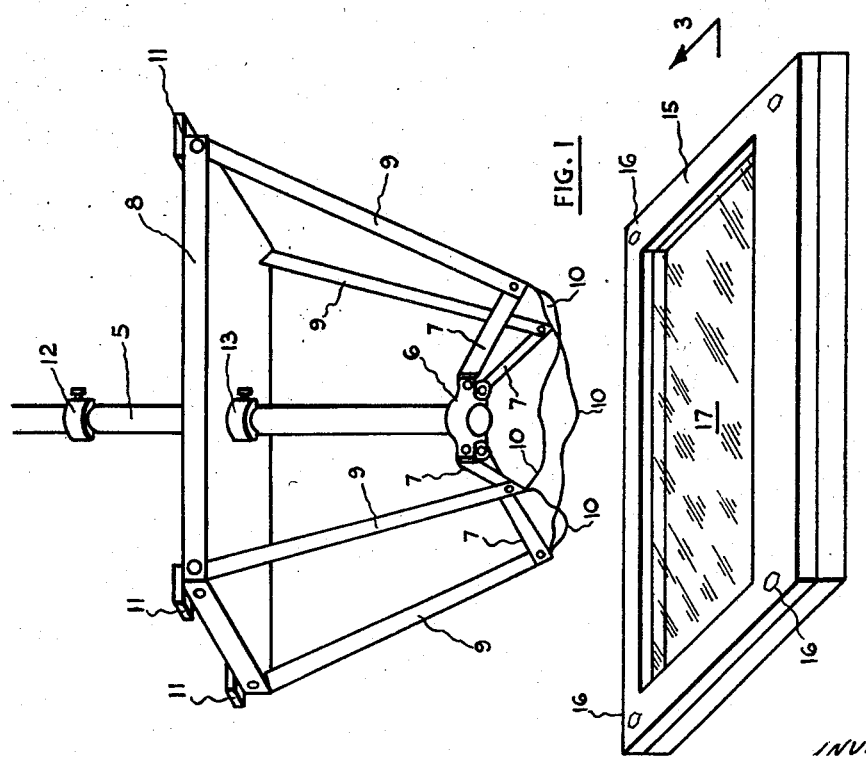
Figure 1 is a perspective view of the apparatus prior to commencing the stretching operation.

Upon retracting the rod 5 upwardly, the links 7 and 9 return towards the position shown in Figures 1 and 3, the wires 10 slacken, and the stop 12 rises from engagement with the plate 8, until the stop 13 engages the underside of the plate 8, whereupon the entire plunger is lifted away from the plates 14 and 15 so that the cubical container may be released from the clamping means and removed. The operation may then be repeated with a further sheet of resinous material.

The present invention may be applied to any synthetic resinous sheet material which can be permanently deformed by pressure, whether in the heated or unheated condition, and is particularly applicable to thermoplastics having viscous but fluid melts, for example, polythene, amorphous polyethylene terephthalate and nylon. The polythene sheet in the above example could be replaced by an amorphous polyethylene terephthalate sheet between 0.005 inch and 0.050 inch thick. The thermoplastic sheet may be heated to the softening temperature in any known way before stretching is commenced. For instance, a heater may be placed under the sheet after clamping between the plate 14 and 15, and removed before the stretching operation begins.

The method of the present invention may be combined with the conventional fluid pressure moulding method to produce deep-drawn articles having shapes and uniformity of wall thicknesses very difficult to achieve by the latter method alone.

For example, the apparatus above described with reference to Figures 1 to 4 may be varied to produce hollow octagonal prisms by shaping the plate 8 and the apertures in the plates 14 and 15 as an octagon and employing eight links 7 and eight links 9. The clamping means may be mounted at the mouth of a vented split female cylindrical mould having an internal diameter approximately 5% greater than the diagonal of the said octagon in such a way that the plate 8 makes an airtight seal with the clamping means when the plunger is fully advanced. After producing a hollow octagonal prism by the method above described, air may be blown into the said prism to further stretch the sheet thereby producing a hollow cylinder having a substantially uniform wall thickness over its entire surface.

It has been found possible to stretch polythene sheet by 1000% using the above described method and apparatus.

I claim:

1. A method of producing a hollow open-topped article by stretching and deforming sheet synthetic resinous material, comprising the steps of: engaging a confined sheet of said material, in a condition capable of being deformed, by an expansible plunger at a plurality of locations so spaced that upon stretching the the sheet to produce the article the areas defined by the edges of the confined sheet, by straight lines joining adjacent pairs of said locations, and by straight lines joining the locations to the corners of the sheet, and the area bounded by the straight lines joining the pairs of locations, are all expanded in substantially the same proportion; then advancing and expanding the plunger, while maintaining engagement between the plunger and sheet at the same locations, to stretch the sheet to produce the article; causing the material to set; and then withdrawing the plunger.

2. A method according to claim 1 wherein the synthetic resinous material is thermoplastic, and the sheet thereof is brought to the deformable condition by the application of a source of heat, which is withdrawn before stretching of the sheet is commenced.

3. Apparatus for producing from sheet synthetic resinous material a hollow, open-topped container having a polygonal bottom and rectangular sides, comprising: a holding member having a polygonal aperture in the shape of the cross section of the container and gripping means for said sheet material around the edges of said aperture; a rod movable perpendicularly to and axially of the aperture from a retracted position at which the entire rod lies outside the aperture to an advanced position at which the rod extends through the aperture; a frame disposed about the rod and movable with respect thereto; corresponding to each corner of the aperture an assembly of links maintained coplanar with the rod, and comprising a first link equal in length to the depth of the container and a second link equal in length to the distance of the respective corner from the line of travel of the rod, the said links being pivoted together at one end, the free end of the first link being pivoted to the frame at a distance from the rod equal to the length of the second link, and the free end of the second link being pivoted to the end of the rod nearer to the holding member in the retracted position of the rod; flexible members, equal in length to the corresponding side of the aperture, joining adjacent pairs of junctions of the first links with the second links; and means located upon the rod limiting the movement of the rod relatively to the frame between a first position at which the second links are perpendicular to the rod and a second position at which the ratio of each area defined by the edges of the aperture, by straight lines joining adjacent pairs of the geometrical projections in the plane of the aperture of the junctions of the first links with the second links, and by straight lines joining the said geometrical projections to the corners of the aperture, to the corresponding area in the first position, and the ratio of the area bounded by the straight lines joining the pairs of geometrical projections to the area of the aperture, are all substantially equal.

References Cited in the file of this patent

UNITED STATES PATENTS

| | | |
|---|---|---|
| 825,052 | Henry et al. | July 3, 1906 |
| 953,647 | Torrance | Mar. 29, 1910 |
| 1,497,190 | Moland | June 10, 1924 |
| 2,354,564 | Wiley | July 25, 1944 |

FOREIGN PATENTS

| | | |
|---|---|---|
| 631,906 | France | Sept. 24, 1927 |